(12) United States Patent
Spadini (10) Patent No.: US 9,817,667 B2
(45) Date of Patent: Nov. 14, 2017

(54) TECHNIQUES FOR SCHEDULING OPERATIONS AT AN INSTRUCTION PIPELINE

(71) Applicant: Advanced Micro Devices, Inc., Sunnyvale, CA (US)

(72) Inventor: Francesco Spadini, Sunset Valley, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1098 days.

(21) Appl. No.: 13/901,136

(22) Filed: May 23, 2013

(65) Prior Publication Data

US 2014/0351562 A1 Nov. 27, 2014

(51) Int. Cl.
*G06F 9/30* (2006.01)
*G06F 7/38* (2006.01)
*G06F 9/38* (2006.01)

(52) U.S. Cl.
CPC .......... *G06F 9/3836* (2013.01); *G06F 9/3824* (2013.01); *G06F 9/3889* (2013.01)

(58) Field of Classification Search
CPC .................. G06F 9/4881; H04L 2209/125
See application file for complete search history.

(56) References Cited

U.S. PATENT DOCUMENTS

| | | | | |
|---|---|---|---|---|
| 2002/0133530 | A1* | 9/2002 | Koning | G06F 9/52 718/102 |
| 2002/0138679 | A1* | 9/2002 | Koning | G06F 9/4881 710/244 |
| 2007/0124568 | A1* | 5/2007 | Kra | G06F 9/462 712/226 |
| 2009/0254774 | A1* | 10/2009 | Chamdani | G06F 9/4881 714/2 |

* cited by examiner

*Primary Examiner* — Hyun Nam (57) ABSTRACT

A dispatch stage of a processor core dispatches designated operations (e.g. load/store operations) to a temporary queue when the resources to execute the designated operations are not available. Once the resources become available to execute an operation at the temporary queue, the operation is transferred to a scheduler queue where it can be picked for execution. By dispatching the designated operations to the temporary queue, other operations behind the designated operations in a program order are made available for dispatch to the scheduler queue, thereby improving instruction throughput at the processor core.

18 Claims, 5 Drawing Sheets

TECHNIQUES FOR SCHEDULING OPERATIONS AT AN INSTRUCTION PIPELINE

BACKGROUND

Field of the Disclosure

The present disclosure generally relates to processors and more particularly to techniques for scheduling execution of operations at a processor.

Description of the Related Art

Some processors employ an instruction pipeline to facilitate execution of instructions. The instruction pipeline typically includes a fetch stage to fetch instructions in a program stream, a decode stage to decode each instruction into one or more operations, a dispatch stage to dispatch the decoded operations to one or more execution units, and a retire stage to retire instructions after their corresponding operations have been executed. Each operation requires a corresponding number of resources in order to be executed at the execution units. For example, a load/store operation (an operation to retrieve data from or store data to memory) can require one or more registers in a physical register file, space in a load/store queue of a load/store unit, and the like. The dispatch stage of the instruction pipeline holds each operation in a queue until the resources to execute the operation are available (i.e. not being used to execute other operations). However, because operations behind the held operation in the program stream are also held at the dispatch stage, an operation that awaits resources for a relatively long period of time can significantly reduce processor performance.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-5 illustrate techniques for increasing instruction throughput by dispatching designated operations (e.g. load/store operations) from a dispatch stage of an instruction pipeline to a temporary queue when the resources to execute the designated operations are not available. Once the resources become available to execute an operation at the temporary queue, the operation is transferred to a scheduler queue where it can be picked for execution. By dispatching the designated operations to the temporary queue, other operations behind the designated operations at the dispatch stage are made available for dispatch to the scheduler queue, thereby improving instruction throughput at the instruction pipeline.

To illustrate, the dispatch stage of the instruction pipeline is generally configured to dispatch operations in-order relative to a program order. Accordingly, the dispatch stage stores operations awaiting dispatch in a dispatch queue in the program order. Conventionally, the dispatch queue would dispatch an operation from the dispatch queue to a scheduler queue of an execution unit responsive to the execution unit indicating that the resources to execute the operation are available (not being used to execute another operation). Thus, until the resources to execute an operation are available, the operation is stalled at the dispatch queue. Further, operations behind the stalled operation in the program order are conventionally also stalled at the dispatch queue, even if the resources to execute those operations are available. Accordingly, to improve instruction throughput the stalled operation is dispatched to a temporary queue, thereby making operations behind the stalled operation available for dispatch. The stalled operation therefore does not stall the operations behind it in the program order, thereby improving instruction throughput.

For purposes of description, load/store operations are described herein as the designated operations that can be sent to the temporary queue. However, it will be appreciated that this is an example only, and that other types of operations could be designated as candidates to be sent to the temporary queue. Further, for purposes of description the temporary queue is referred to herein as a store/load allocation queue (SLAQ).

Figure 1:
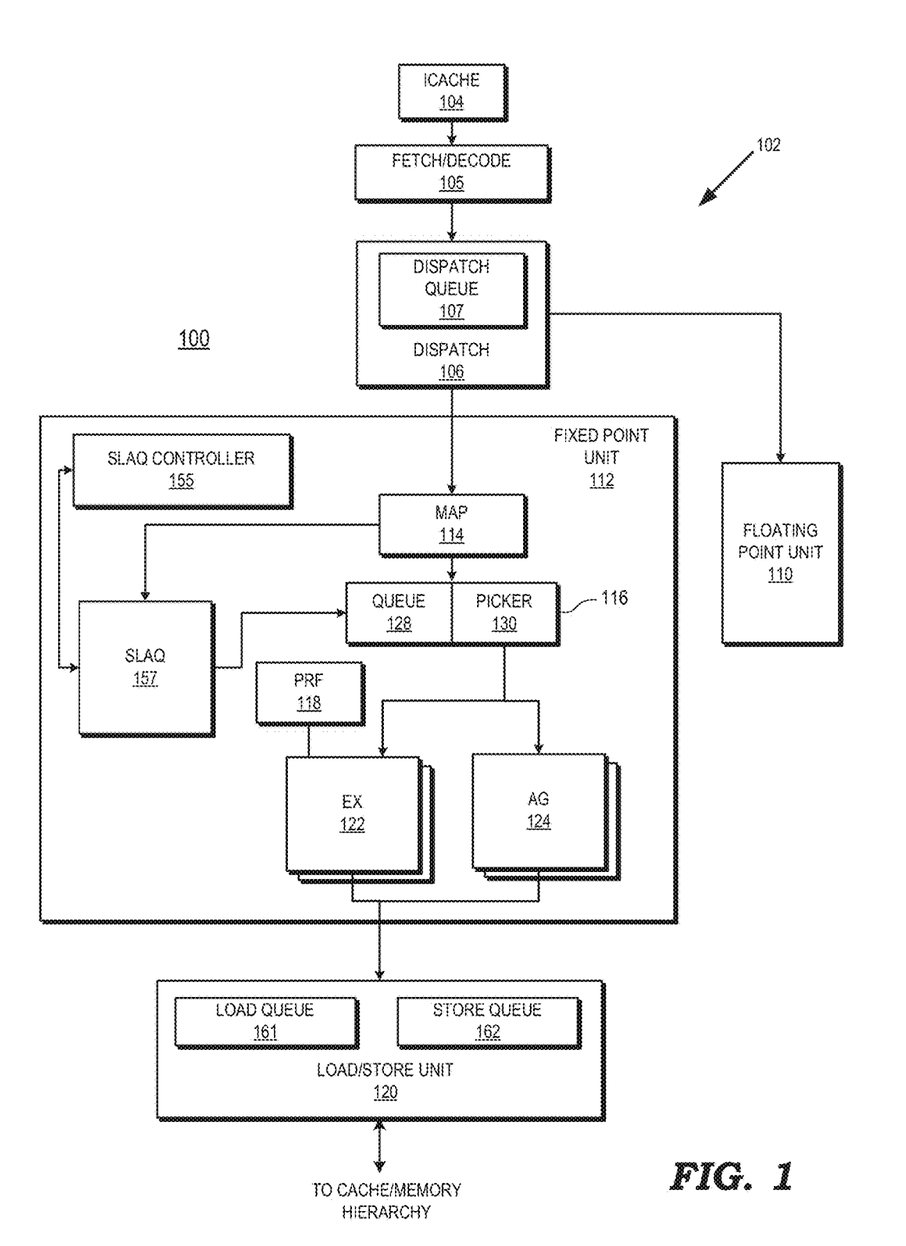
FIG. 1 is a block diagram of a processor core in accordance with some embodiments.

FIG. 1 illustrates a processor core 100 of a processor having an execution pipeline 102 that employs a SLAQ to temporarily store dispatched load/store operations when the resources to execute those operations are not available. The illustrated processor core 100 can include, for example, a central processing unit (CPU) core based on an x86 instruction set architecture (ISA), an ARM ISA, and the like. The processor can implement a plurality of such processor cores, and the processor can be implemented in any of a variety of electronic devices, such as a notebook computer, desktop computer, tablet computer, server, computing-enabled cellular phone, personal digital assistant (PDA), set-top box, and the like.

In the depicted example, the processor core 100 implements an execution pipeline 102 including an instruction cache 104, a fetch/decode unit 105, a dispatch stage 106, one or more floating point units 110, and one or more fixed point units 112 (also commonly referred to as "integer execution units"). The processor core 100 also includes a load/store unit (LSU) 120 connected to a memory hierarchy, including one or more levels of cache (e.g., L1 cache, L2, cache, etc.), a system memory, such as system RAM, and one or more mass storage devices, such as a solid-state drive (SSD) or an optical drive.

The instruction cache 104 stores instruction data which is fetched by the fetch/decode unit 105 in response to demand fetch operations (e.g., a fetch to request the next instruction in the instruction stream identified by the program counter) or in response to speculative prefetch operations. The fetch/decode unit 105 decodes instructions fetched by the fetch unit into one or more operations that are to be performed, or executed, by either the floating point unit 110 or the fixed point unit 112. In a microcoded processor architecture, this decoding can include translating the instruction into one or more micro-operations (uOps), whereby each uOp is identified by a corresponding opcode value and can be separately executed within the fixed point unit 112.

The fetch/decode unit 105 provides the operations to the dispatch stage 106, which stores the operations in program order at a dispatch queue 107. Responsive to dispatch signaling, the dispatch stage 106 dispatches operations from the dispatch queue, in order, to one of the floating point unit 110 and the fixed point unit 112. In particular, those operations involving floating point calculations are dispatched to the floating point unit 110 for execution, whereas operations involving fixed point calculations are dispatched to the fixed point unit 112.

The fixed point unit 112 includes a map unit 114, a scheduler unit 116, a physical register file (PRF) 118, and one or more execution (EX) units 122, such as one or more arithmetic logic units (ALUs), and one or more address generation (AG) units 124. The PRF 118 stores a set of physical registers, each of which is associated with a different physical register name (PRN) (also referred to as a physical register number). For convenience, as used herein the PRN can refer to the name of the physical register, and can refer to the physical register that has that name. Thus, for example, "storing data at a PRN" indicates that the data is stored at the physical register identified by the PRN.

The scheduler unit 116 includes a scheduler queue 128 and a picker 130. In an operation of the fixed point unit 112, the map unit 114 receives operations from the dispatch stage 106 (usually in the form of operation codes, or opcodes). These dispatched operations typically also include, or reference, operands used in the performance of the represented operation, such as a memory address at which operand data is stored, an architected register at which operand data is stored, one or more constant values (also called "immediate values"), and the like. The map unit 114 and the scheduler unit 116 control the selective distribution of operations among the EX units 122 and AG units 124, whereby operations to be performed are queued in the scheduler queue 128 and then picked therefrom by the picker 130 for issue to a corresponding EX unit or AG unit. Typically, each queue entry of the scheduler queue 128 includes a field to store the operation payload or operation identifier (e.g., the opcode for the operation), fields for the addresses or other identifiers of physical registers that contain the source operand(s) for the operation, fields to store any immediate or displacement values to be used the operation, and a destination field that identifies the physical register in which the result of the execution of the corresponding operation is to be stored. For example, a store instruction includes a movement operation to move data to an LSU, an architected register operand indicating the PRN that stores the data to be stored (the store data) and address information used to calculate a memory address where the data is to be stored.

Prior to storing an operation in the scheduler queue 128, the map unit 114 performs register renaming whereby external operand names (that is, architected register names (ARNs)) are translated into internal operand names (that is, PRNs). This renaming process includes the map unit 114 evaluating a subset of operations including the operation to be queued to identify some dependencies between sources and destinations associated with the operations, and then mapping architected registers to physical registers so as to avoid false dependencies and facilitate parallel execution of independent operations as using register renaming techniques known in the art.

The picker 130 monitors the scheduler queue 128 to identify operations ready for execution, and upon picking an available operation and verifying its operands are ready and available, dispatches the operation to an EX unit or an AG unit. The picker 130 waits to pick operations for a dependent instruction until it receives an indication that the operations for the instructions from which the dependent instruction depends have been satisfied.

Operations requiring retrieval or storage of data, such as load or store operations, are dispatched by the picker 130 to an AG unit 124, which calculates the memory address associated with the operation and directs the LSU 120 to perform the corresponding memory access using the generated address. For example, for load operations, the calculated memory address is provided to a load queue 161 at the LSU 120. The LSU 120 retrieves the memory address from the load queue 161 and retrieves the data stored at the memory address from the memory hierarchy. Operations requiring numerical manipulations or other arithmetic calculations are dispatched to the appropriate EX unit 122 for execution.

The address generation operations performed by the AG units 124 and the arithmetic operations performed by the EX units 122 typically utilize operand data, in the form of one or both of operands stored in source registers immediate/displacement values. The immediate/displacement value used during execution operation is dispatched to the EX/AG unit along with the operation from the scheduler queue 128. The source operands stored in the physical registers are read from the PRF 118 and provided to the corresponding EX/AG unit for use in executing the operation. Typically, these source operands are obtained by initiating a PRF read to the PRF 118.

Load operations performed by the AG unit 124/LSU 120 and arithmetic operations performed by the EX unit 122 result in data that is to be stored in the physical register identified as the destination of the load operation or arithmetic operation. Accordingly, each of the EX unit 122 and the LSU 120, upon generating a result (either by completing an arithmetic operation for the EX unit 122 or by loading data from the memory hierarchy for the LSU 120), initiates a PRF write to the destination PRN of the load instruction.

For store instructions, the picker 130 picks a movement operation associated with the store instruction to cause the EX unit 122 to move the data from the register to the LSU 120. The LSU 120 places the store data into a store queue 162, and communicates with the memory hierarchy to store the data at the calculated memory address.

The fixed point unit 112 further includes a SLAQ controller 155 and a SLAQ 157. The SLAQ controller 155 is configured to provide control signaling to monitor the resources available to execute load/store operations. In particular, in order to execute a load/store operation, the following resources are required: available registers at the PRF 118 for the operands of the load/store operation, space available at the scheduler queue 128, and space available at either the load queue 161 or the store queue 162, depending on the type of operation. As used herein, a resource is available if it has not been allocated to an operation that is being executed or an operation that is awaiting execution. When a load/store operation is the next operation to be dispatched (e.g. is the operation at the head of the dispatch queue 107, the SLAQ controller 155 determines whether there are sufficient resources available to execute the load/store operation. If so, the SLAQ controller 155 indicates to the dispatch stage 106 that the load/store operation can be dispatched to the scheduler queue 128. If there are insufficient resources to execute the load/store operation, the SLAQ controller 155 determines if there is available space at the SLAQ 157. If so, the SLAQ controller 155 signals the dispatch stage 106 to dispatch the load/store operation to the SLAQ 157. The operation is stored at the SLAQ 157 after it has proceeded through the map unit 114 to ensure that any subsequent operations that are dependent on the load/store operation can be identified and not picked until the load/store operation is executed. If there is no available space at the SLAQ 157 to store the load/store operation, the SLAQ controller 155 indicates to the dispatch stage 106 that the load/store operation must be stalled at the dispatch queue 107 until either space becomes available at the SLAQ 157 or sufficient resources to execute the load/store operation become available.

In some embodiments, the SLAQ controller 155 does not indicate to the dispatch stage 106 to dispatch the load/store operation to the SLAQ 157 until at least a subset of the resources needed to execute the load/store operation are available. For example, in some embodiments the SLAQ controller 155 indicates to the dispatch stage 106 that a load/store operation is to be dispatched when the necessary space to store the load/store operation is available at the scheduler queue 128 and when the necessary PRN's to execute the load/store operation are available, but space at the requisite one of the load queue 161 or the store queue 162 is not available. This ensures that the load/store operation is unlikely to be stored at the SLAQ 157 for an extended period of time, since at least a subset of the resources needed to execute the load/store operation are already available.

Load/store operations stored at the SLAQ 157 are not available to be selected by the picker 130. For the load/store operation stored at the head of the SLAQ 157, the SLAQ controller 155 monitors the resources available to execute load/store operations. Once the SLAQ controller 155 determines that the resources are available to execute the load/store operation at the head of the SLAQ 157, the SLAQ controller 155 transfers the operation to the scheduler queue 128 so that is available to be selected by the picker 130.

In some embodiments, such as the illustrated example of FIG. 1, the SLAQ 157 is a separate storage structure from the scheduler queue 128, such that the picker 130 cannot physically access the entries of the SLAQ 157. Accordingly, in order to transfer an operation from the SLAQ 157 to the scheduler queue 128, the SLAQ controller 155 transfers the bits representing the load/store operation from its corresponding entry of the SLAQ 157 to an entry of the scheduler queue 128.

In some embodiments, the SLAQ 157 and the scheduler queue 128 are part of the same storage structure, such that all of the entries of the storage structure are physically accessible to the picker 130. The entries of the SLAQ 157 are designated by an indicator such as flag or field of the entry, such that the control modules of the picker 130 will not select operations designated as stored at the SLAQ 157. In order to transfer entries from the SLAQ 157 to the scheduler queue 128, the flag, field of the entry, or other indicator is set to indicate that the corresponding entry is not part of the SLAQ 157, but is part of the scheduler queue 128. In some embodiments, a load/store operation is indicated to be stored at the SLAQ 157 by indicating that the load/store operation is dependent on a non-existent or non-dispatched operation. Because the picker 130 will not select an operation that is dependent on a non-dispatched operation, the dependency indication prevents the load/store operation from being picked for execution. The SLAQ controller 155 can transfer the load/store operation from the SLAQ 157 to the scheduler queue 128 by clearing the dependency indication, such that the load/store operation no longer appears to be dependent on the non-existent or non-dispatched operation.

Figure 2:
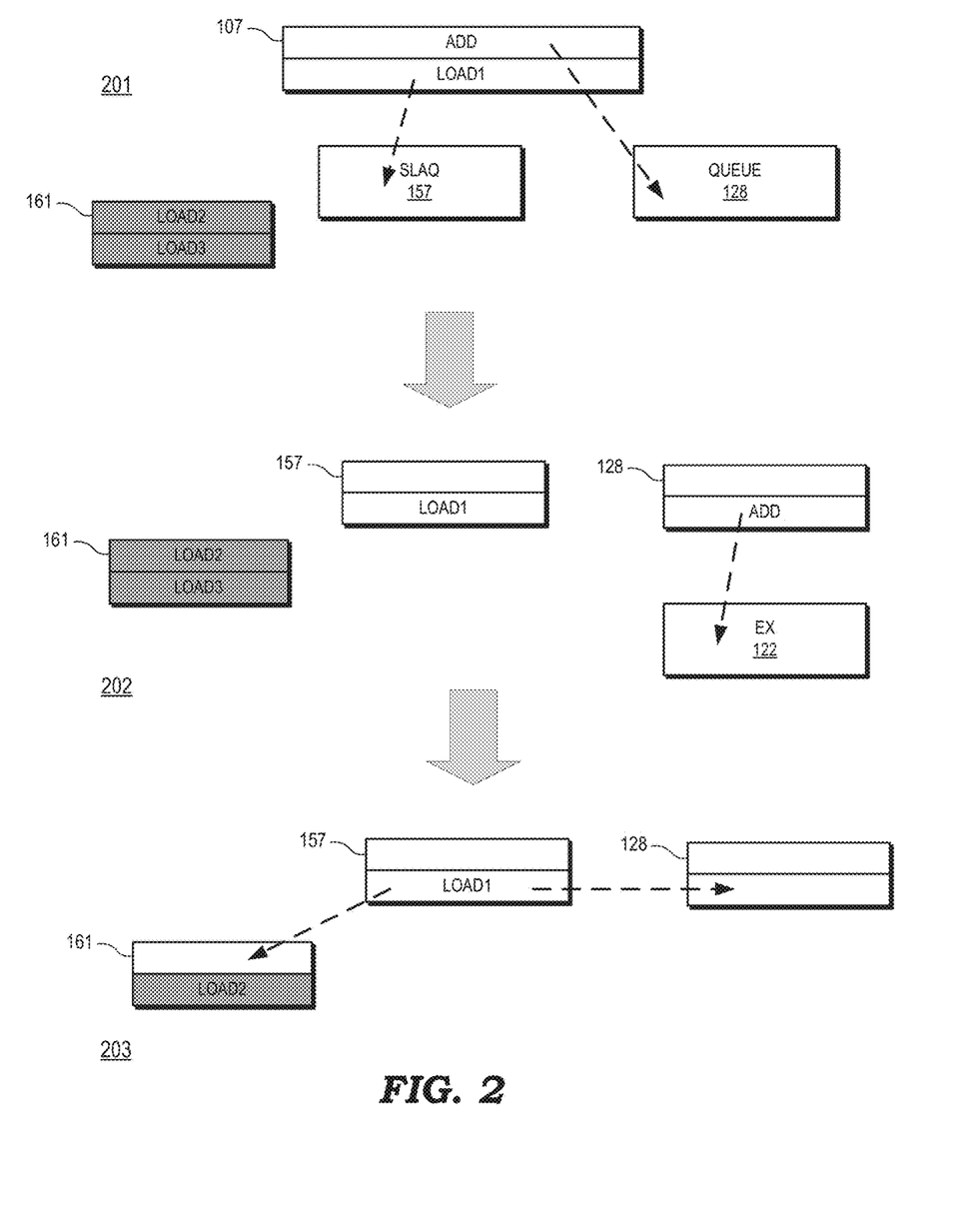
FIG. 2 is a diagram of an example of the processor core of FIG. 1 dispatching an operation when resources for execution of the operation are not available in accordance with some embodiments.

FIG. 2 illustrates an example of the processor core 100 dispatching a load/store operation based on whether the resources to execute the operation are available in accordance with some embodiments. In the illustrated example, at time 201 at load operation, designated "LOAD1", is at the head of the dispatch queue 107, while an addition operation, designated "ADD" is behind LOAD1 in the dispatch queue 107. In addition, at time 201 all of the available space at the load queue 161 of the LSU 120 has been allocated to other load operations, designated "LOAD2" and "LOAD3". Accordingly, because there is insufficient space available at the load queue 161 to be allocated to LOAD1, there are insufficient resources to execute it. Further, it is assumed for purposes of the example of FIG. 2 that there are sufficient resources to execute ADD.

In response to determining that there are insufficient resources to execute LOAD1, the SLAQ controller 155 sends control signaling to the dispatch stage 106 so that LOAD1 is transferred to the SLAQ 157. This places ADD at the head of the dispatch queue 107. The dispatch stage 106 determines that there are sufficient resources to execute ADD, and therefore dispatches it to the scheduler queue 128.

In the example of FIG. 2, it is assumed that ADD is not dependent on LOAD1. Accordingly, at time 202 the picker 130 selects ADD for execution at an EX unit 122. Thus, ADD is executed even though there are insufficient resources to execute the LOAD1 operation that is ahead of ADD in the program order. Conventionally, without the SLAQ 157, the ADD operation could not be dispatched or executed until LOAD1 is dispatched from the dispatch queue 107 to the scheduler queue 128. Thus, the ADD operation would be stalled until there were sufficient resources to execute the LOAD1 operation. By allowing the LOAD1 operation to be dispatched to the SLAQ 157, the ADD1 operation can be executed without waiting for resources to execute the LOAD1 operation to become available, thereby improving instruction throughput at the processor core 100.

At time 203, execution of LOAD3 has reached a point whereby there is space available at the load queue 161 to store LOAD1. In response, the SLAQ controller 155 transfers LOAD1 to the scheduler queue 128 and to the load queue 161. LOAD1 is therefore available to be selected by the picker 130 for execution.

In some embodiments, ADD is dependent on LOAD1, such that it cannot be executed until execution of LOAD1 is complete. Accordingly, ADD is stored at the scheduler queue 128 until after LOAD1 has been transferred to the scheduler queue 128, selected for execution, and executed. Nevertheless, because ADD has already been dispatched and processed at the map unit 114, it is executed more quickly relative to being stalled at the dispatch stage 106.

Figure 3:
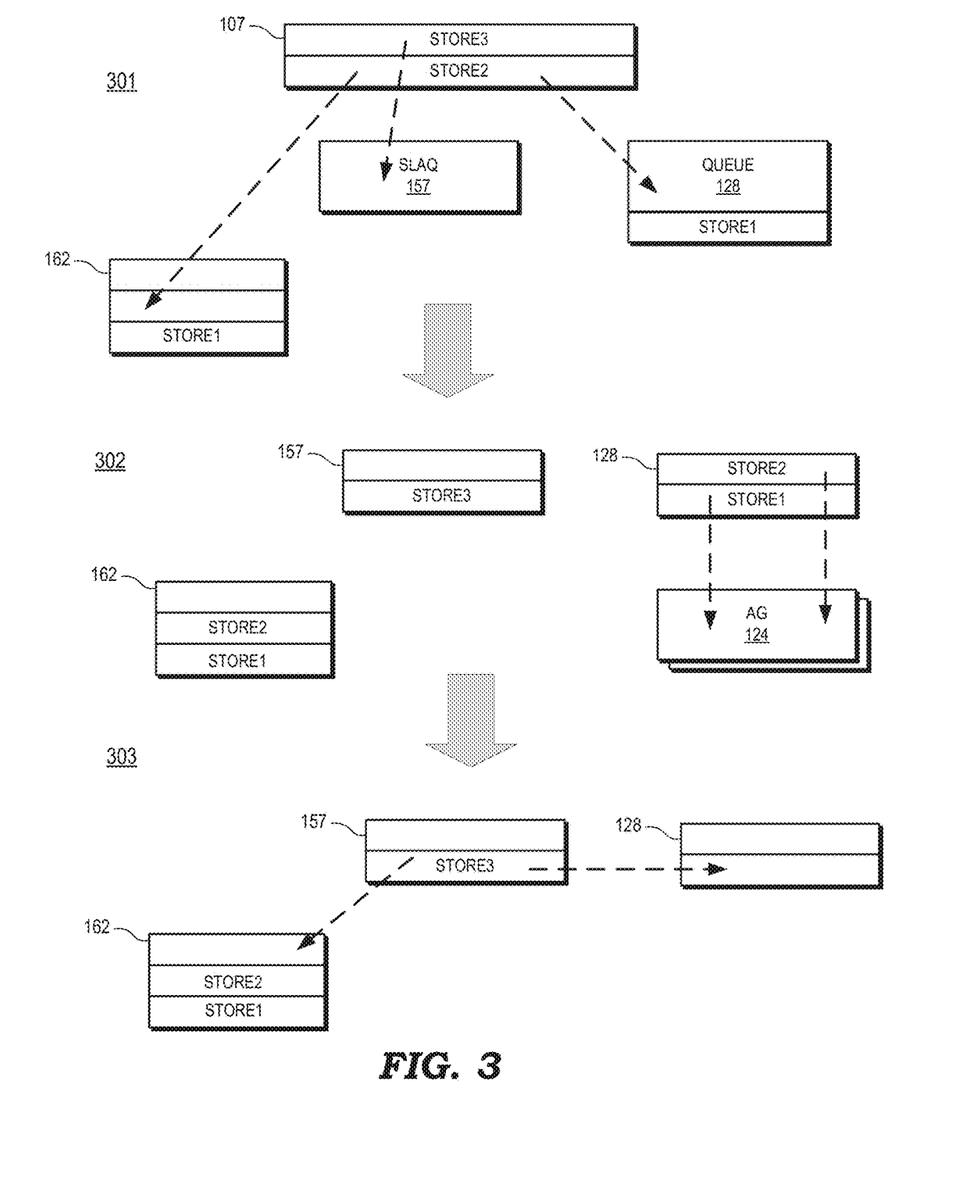
FIG. 3 is a block diagram of another example of the processor core of FIG. 1 dispatching an operation when resources for execution of the operation are not available in accordance with some embodiments.

In some embodiments, the LSU 120 may have a limited number of ports to receive load/store operations. The ports are a resource that must become available in order to execute a pending load/store operation. Accordingly, the SLAQ 157 can be used to temporarily store load/store operations for which there are insufficient ports to transfer to the LSU 120 during a given transfer cycle, thereby preventing those load/store operations from stalling other operations at the dispatch queue 107. An example of this scenario is illustrated by FIG. 3, which depicts an example of the processor core 100 dispatching multiple load/store operations in accordance with some embodiments.

At time 301, a store operation, designated STORE1 is pending at the scheduler queue 128, waiting to be selected for execution at the picker 130. In addition, two other store operations, designated STORE2 and STORE3, are at the head entry and the subsequent entry, respectively, of the dispatch queue 107. Further, at time 301 there is sufficient space at the store queue 162 to accommodate all of the stores, and it is assumed that there is sufficient space at the PRF 118 and the scheduler queue 128. However, for the example of FIG. 3 it is further assumed that there is only one allocation port for the store queue 162, such that only one store operations can be sent to the LSU 120 during a given cycle. Accordingly, for the given cycle, only the STORE2 operation can be sent to the LSU 120 from the dispatch queue 107 for storage at the store queue 162. Conventionally, the limited number of ports would require the STORE3 operation to be maintained at the dispatch queue 107 for one or more extra cycles as it awaits availability of the allocation port. That is, for the given cycle, an allocation port at the store queue 162 is a resource needed to execute the STORE3 operation, but it is unavailable. The resulting delay as the STORE3 operation is stalled at the dispatch queue 107 can also delay other operations behind the STORE3 operation in the queue, and also delay processing of the STORE3 operation at the map unit 114. Accordingly, by sending the STORE3 operation to the SLAQ 157, instruction throughput is increased.

To illustrate, at time 301 the STORE2 operation is provided to the scheduler queue 128 and the store queue 162 via the available port, while the STORE3 operation is provided to the SLAQ 157 via the map unit 114. At time 302 the STORE1 and STORE2 operations are provided to the AG units 124 for address calculation. At time 303 the STORE3 operation is transferred to the scheduler queue 128 and to the store queue 162 while the STORE1 and STORE2 operations are sent to the store queue 162 via the available port. The STORE3 operation is now available for selection by the picker 130 for address calculation. In the absence of the SLAQ 157, the STORE3 operation would need to be transferred from the dispatch queue 107 through the map unit 114, thereby delaying selection of the STORE3 operation, as well as processing of any operations behind the STORE3 operation at the dispatch queue 107.

Figure 4:
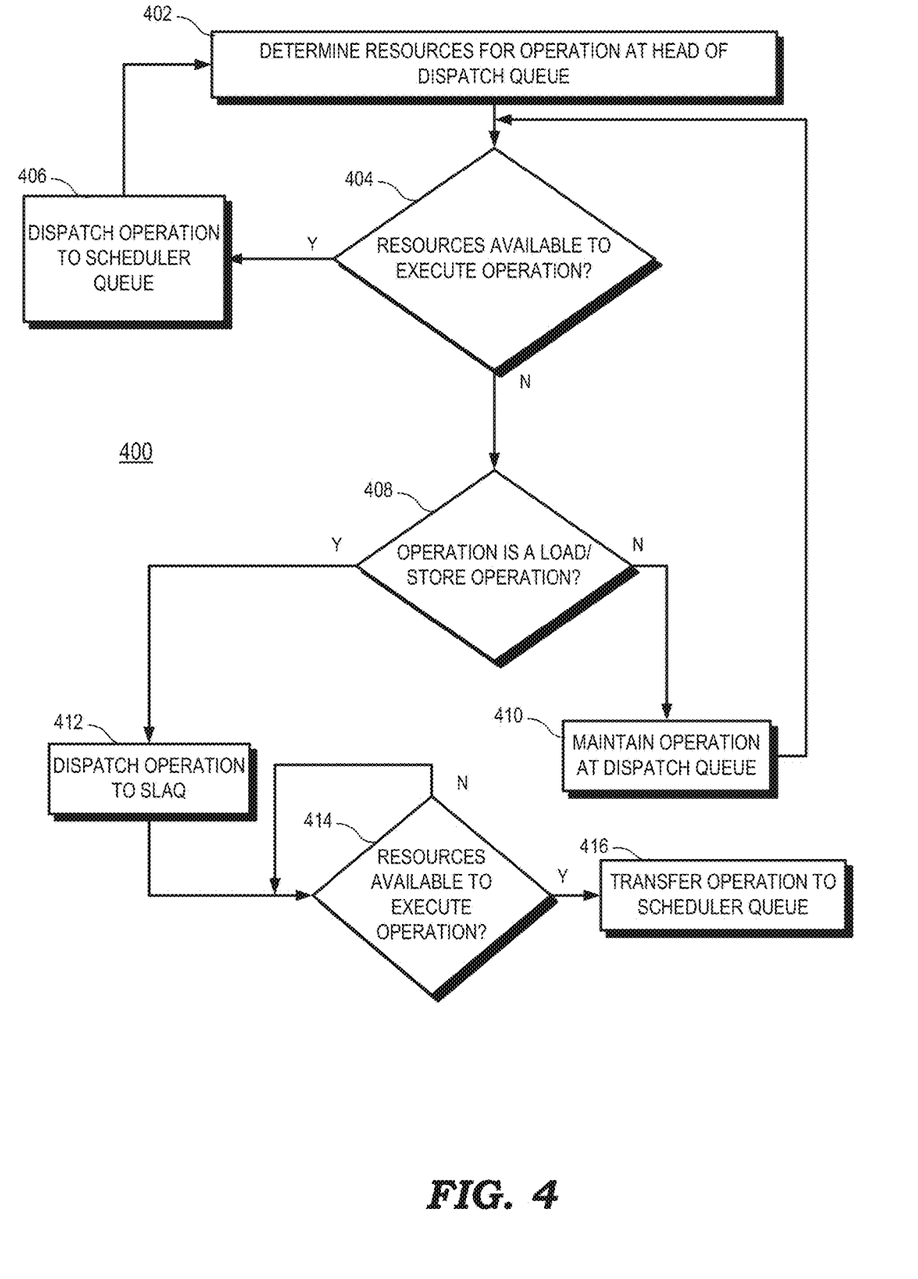
FIG. 4 is a flow diagram of a method of dispatching operations at a processor core in accordance with some embodiments.

FIG. 4 illustrates a flow diagram of a method 400 of dispatching operations at a processor core in accordance with some embodiments. The method 400 is described with respect to an example implementation at the processor core 100 of FIG. 1. At block 402 the dispatch stage 106 identifies the resources required to execute the operation at the head of the dispatch queue 107. At block 404 the dispatch stage 106 determines whether the resources required to execute the operation are available at the fixed point unit 112 and the LSU 120. If so, the method flow moves to block 406 and the dispatch stage dispatches the operation to the scheduler queue 108.

If, at block 404, the dispatch stage 106 determines that there are insufficient resources to execute the operation, the method flow moves to block 408 and the SLAQ controller 155 determines whether the operation at the head of the dispatch queue 107 is a load/store operation. If not, the method flow moves to block 410 and the operation is maintained at the head of the dispatch queue 107 until there are sufficient resources available to execute the operation. If the operation at the head of the dispatch queue 107 is a load/store operation, the method flow moves to block 412 and the SLAQ controller 155 sends control signaling to the dispatch queue 107 so that the operation is dispatched to the SLAQ 157. The method flow proceeds to block 414 and the SLAQ controller 155 determines whether there are sufficient resources available to execute the operation at the head of the SLAQ 157. If not, the SLAQ controller 155 waits until there are sufficient resources available to execute the operation. Once there are sufficient resources available to execute the operation, the method flow proceeds to block 416 and the SLAQ controller 155 transfers the operation at the head of the SLAQ 157 to the scheduler queue 128.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
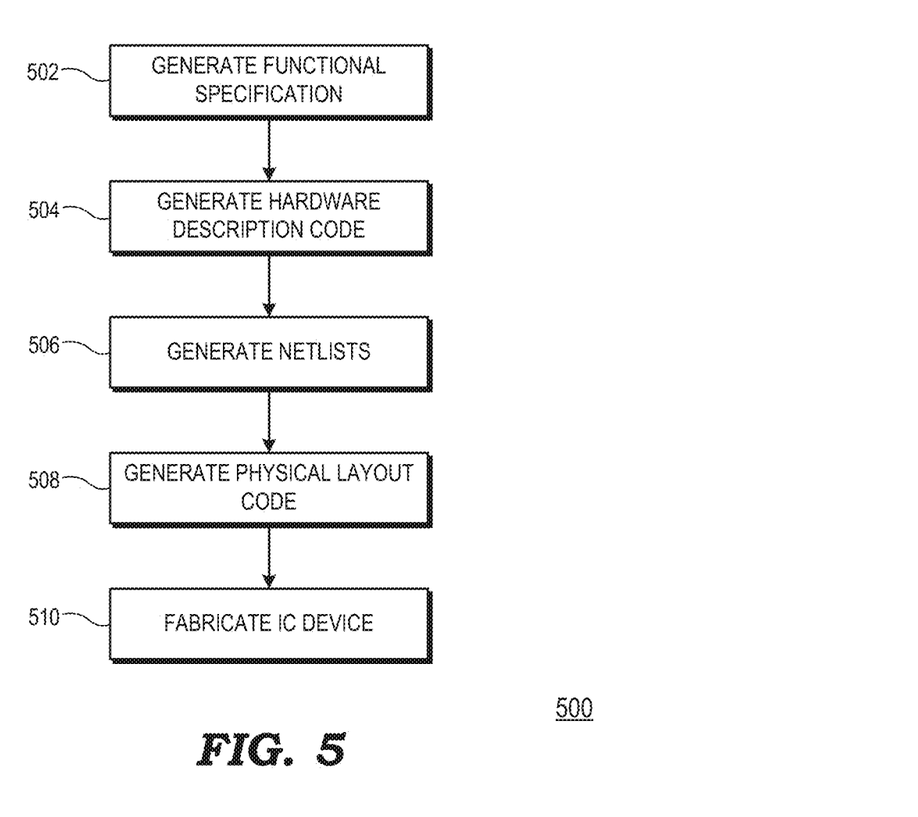
FIG. 5 is a flow diagram illustrating a method for designing and fabricating an integrated circuit device implementing at least a portion of a component of a processor in accordance with some embodiments.

FIG. 5 is a flow diagram illustrating an example method 500 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method includes: dispatching a first operation from a dispatch stage of an instruction pipeline to a first queue of a set of execution units of the instruction pipeline in response to there being insufficient resources at the instruction pipeline to execute the first operation, the first operation not available to be picked for execution while stored at the first queue; and providing the first operation from the first queue to a second queue in response to sufficient resources to execute the first operation becoming available at the set of execution units, the first operation available to be picked for execution while stored at the second queue. In some aspects, the method includes dispatching a second operation from the dispatch stage to the second queue while the first operation is stored at the first queue, the second operation available to be picked for execution while stored at the second queue. In some aspects, the second operation is dependent on the first operation. In some aspects, the second operation is independent of the first operation. In some aspects, the first operation is a load/store operation and the second operation is not a load/store operation. In some aspects, the first operation is load/store operation; and dispatching the first operation comprises dispatching the first operation to the first queue in response to there not being space available at a third queue of a load/store unit to store the first operation. In some aspects providing the first operation to the second queue comprises providing the first operation to the second queue in response to space becoming available at the third queue to store the first operation. In some aspects the first operation is a load/store operation; and dispatching the first operation comprises dispatching the first operation to the first queue in response to there not being sufficient ports to receive the first operation at a load/store unit during a selected cycle of the instruction pipeline. In some aspects the first queue and the second queue are portions of the same storage structure; and dispatching the first operation to the first queue comprises storing the first operation at the storage structure and setting an indicator to indicate that the first operation is not available to be picked for execution In some aspects the first queue and the second queue are portions of the same storage structure; and dispatching the first operation to the first queue comprises storing the first operation at the storage structure and setting an indicator to indicate that the first operation dependent on a third operation not stored at the first queue or the second queue.

In some embodiments, a method includes: in response to there being insufficient resources at an instruction pipeline to execute a first operation, dispatching the first operation to a first queue, the first operation not available to be picked for execution while stored at the first queue; and in response to dispatching the first operation to the first queue, dispatching a second operation to a second queue so that the second operation is available to be picked for execution. In some aspects the second operation is subsequent to the first operation in a program order of a program being executed at the instruction pipeline. In some aspects dispatching the first operation to the first queue comprises dispatching the first operation to the first queue in response to determining that a first resource of the instruction pipeline is available for execution of the first operation and that a second resource of the instruction pipeline is not available for execution of the first operation. In some aspects the first resource comprises a register at a register file of the instruction pipeline and the second resource comprises an entry of a load/store unit queue.

In some embodiments, an instruction pipeline of a processor includes: a set of execution units comprising: a plurality of resources to execute operations; a picker to pick operations for execution; a first queue to store operations, the operations stored at the first queue not available to be picked by the picker; and a second queue to store operations, the operations stored at the second queue available to be picked by the picker; and a dispatch stage to: dispatch a first operation to the first queue in response to there being insufficient resources to execute the first operation; and dispatch a second operation to the second queue in response to there being sufficient resources to execute the second operation. In some aspects the set of execution units is to transfer the first operation from the first queue to the second queue in response to sufficient resources of the plurality of resources to execute the first operation becoming available. In some aspects the set of execution units comprises a load/store unit to load data from and store data to a cache; the plurality of resources comprises a load/store queue of the load/store unit; the first operation comprises a load/store operation; and the dispatch stage is to dispatch the load/store operation to the first queue in response to there not being an entry at the load/store queue to store the load/store operation. In some aspects the dispatch stage is to dispatch the second operation to the second queue while the first operation is stored at the first queue. In some aspects the second operation is after the first operation in a program order of a set of instructions being executed at the instruction pipeline. In some aspects the first operation is a load/store operation and the second operation is not a load/store operation.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
dispatching a first operation decoded from an instruction from a dispatch stage of an instruction pipeline to a first queue of a set of execution units of the instruction pipeline in response to there being insufficient resources at the instruction pipeline to execute the first operation, the first operation not available to be picked for execution while stored at the first queue, wherein the first operation is load/store operation, and wherein the first operation is dispatched in response to there not being space available at a third queue of a load/store unit to store the first operation; and
providing the first operation from the first queue to a second queue in response to sufficient resources to execute the first operation becoming available at the set of execution units, the first operation available to be picked for execution while stored at the second queue.

2. The method of claim 1, further comprising:
dispatching a second operation from the dispatch stage to the second queue while the first operation is stored at the first queue, the second operation available to be picked for execution while stored at the second queue.

3. The method of claim 2, wherein the second operation is dependent on the first operation.

4. The method of claim 2, wherein the second operation is independent of the first operation.

5. The method of claim 2, wherein the second operation is not a load/store operation.

6. The method of claim 1, wherein providing the first operation to the second queue comprises providing the first operation to the second queue in response to space becoming available at the third queue to store the first operation.

7. The method of claim 1,
wherein dispatching the first operation comprises dispatching the first operation to the first queue in response to there not being sufficient ports to receive the first operation at a load/store unit during a selected cycle of the instruction pipeline.

8. The method of claim 1, wherein:
the first queue and the second queue are portions of the same storage structure; and
dispatching the first operation to the first queue comprises storing the first operation at a storage structure and setting an indicator to indicate that the first operation is not available to be picked for execution.

9. The method of claim 8, wherein:
the first queue and the second queue are portions of the same storage structure; and
dispatching the first operation to the first queue comprises storing the first operation at the storage structure and setting an indicator to indicate that the first operation dependent on a third operation not stored at the first queue or the second queue.

10. A method, comprising:
in response to there being insufficient resources at an instruction pipeline to execute a first operation decoded from an instruction, dispatching the first operation to a first queue, the first operation not available to be picked for execution while stored at the first queue, wherein the first operation is load/store operation, and wherein the first operation is dispatched in response to there not being space available at a third queue of a load/store unit to store the first operation; and
in response to dispatching the first operation to the first queue, dispatching a second operation to a second queue so that the second operation is available to be picked for execution.

11. The method of claim 10, wherein the second operation is subsequent to the first operation in a program order of a program being executed at the instruction pipeline.

12. The method of claim 10, wherein dispatching the first operation to the first queue comprises dispatching the first operation to the first queue in response to determining that a first resource of the instruction pipeline is available for execution of the first operation and that a second resource of the instruction pipeline is not available for execution of the first operation.

13. The method of claim 12, wherein the first resource comprises a register at a register file of the instruction pipeline and the second resource comprises an entry of a load/store unit queue.

14. An instruction pipeline of a processor comprising:
a set of execution units comprising:
- a load/store unit to load data from and store data to a cache;
- a plurality of resources to execute operations, wherein the plurality of resources comprises a load/store queue of the load/store unit;
- a picker to pick operations decoded from instructions for execution;
- a first queue to store operations, the operations stored at the first queue not available to be picked by the picker; and
- a second queue to store operations, the operations stored at the second queue available to be picked by the picker; and a dispatch stage to:
- dispatch a first operation decoded from an instruction to the first queue in response to there being insufficient resources to execute the first operation, wherein the first operation is a load/store operation, and wherein the dispatch stage is to dispatch the load/store operation to the first queue in response to there not being an entry at the load/store queue to store the load/store operation; and
- dispatch a second operation to the second queue in response to there being sufficient resources to execute the second operation.

15. The instruction pipeline of claim 14, wherein the set of execution units is to transfer the first operation from the first queue to the second queue in response to sufficient resources of the plurality of resources to execute the first operation becoming available.

16. The instruction pipeline of claim 14, wherein the dispatch stage is to dispatch the second operation to the second queue while the first operation is stored at the first queue.

17. The instruction pipeline of claim 16, wherein the second operation is after the first operation in a program order of a set of instructions being executed at the instruction pipeline.

18. The instruction pipeline of claim 17, wherein the first operation is a load/store operation and the second operation is not a load/store operation.

* * * * *

UNITED STATES PATENT AND TRADEMARK OFFICE
CERTIFICATE OF CORRECTION

PATENT NO. : 9,817,667 B2
APPLICATION NO. : 13/901136
DATED : November 14, 2017
INVENTOR(S) : Francesco Spadini Page 1 of 1

It is certified that error appears in the above-identified patent and that said Letters Patent is hereby corrected as shown below:

In the Claims

At Column 12, Claim 9, Line 42, please delete "dependent on a third" and insert --is dependent on a third--.

Signed and Sealed this
Thirty-first Day of March, 2020

Andrei Iancu
*Director of the United States Patent and Trademark Office*